(12) United States Patent
Wang et al.

(10) Patent No.: US 6,359,979 B1
(45) Date of Patent: Mar. 19, 2002

(54) ENHANCED CALL ROUTING IN COMPETITIVE LOCAL TELEPHONE NETWORKS

(75) Inventors: Weilin Wang, Plano; Joyce Bradley, Rowlett, both of TX (US)

(73) Assignee: Nortel Networks LTD, St. Laurent (CA)

( * ) Notice: Subject to any disclaimer, the term of this patent is extended or adjusted under 35 U.S.C. 154(b) by 0 days.

(21) Appl. No.: 09/223,893

(22) Filed: Dec. 31, 1998

(51) Int. Cl.[7] ................................................. H04M 7/00
(52) U.S. Cl. .................................. 379/221.01; 379/219
(58) Field of Search ........................... 379/221.01, 111, 379/219, 221.09, 230

(56) References Cited

U.S. PATENT DOCUMENTS

| | | | | |
|---|---|---|---|---|
| 3,705,523 A | * | 12/1972 | Alouisa | 379/221 |
| 5,867,569 A | * | 2/1999 | Martinez et al. | 379/207 |
| 5,930,348 A | * | 7/1999 | Regnier et al. | 379/221 |
| 6,137,806 A | * | 10/2000 | Martinez | 379/230 X |
| 6,144,730 A | * | 11/2000 | Mukaino | 379/220 |

* cited by examiner

Primary Examiner—Creighton Smith (74) Attorney, Agent, or Firm—Bruce Garlick (57) ABSTRACT

A telephone network includes an Enhanced Call Routing (ECR) function that reroutes calls when the high usage route and fixed tandem routes are overloaded or otherwise unavailable. The ECR function tracks the operation of the telephone network on the basis of origination switches and destination switches and provides temporary network rerouting during outages and unusual loading situations. Further, the ECR function supports Local Number Portability (LNP) so that it may operate in those telephone networks that are designed and/or modified to support LNP. The ECR function resides on a signaling network element such as a Service Switching Point (SSP) and/or a Service Control Point (SCP). A call setup request is received by a Service Switching Point (SSP), an origination switch in the traffic network, and intended for a destination switch. Initial routing via a high usage route and fixed tandem route(s) are unsuccessful. The SSP sends a Network_Busy message to the STP/SCP supporting the ECR function. The ECR function then attempts to determine an alternate tandem route for the call. If successful, the ECR function directs the SSP to route the call along the alternate tandem route, the alternate tandem route either being via the telephone network or via an alternate telephone network coupled thereto. If not successful, the ECR directs the SSP to send the call to a resource for caller notification. In another operation, the ECR function monitors the number of Network_Busy messages received for each originating switch/destination switch pair in the telephone network.

20 Claims, 5 Drawing Sheets

ENHANCED CALL ROUTING IN COMPETITIVE LOCAL TELEPHONE NETWORKS

BACKGROUND

1. Technical Field

The present invention relates generally to telephone networks; and more particularly to the routing of calls within a telephone network when high usage routes and fixed tandem routes are overloaded or unavailable, such routing also employed in an advanced intelligent network that supports local number portability.

2. Related Art

The structure of modern telephone networks often includes a traffic network and a coupled signaling network. The traffic network includes a plurality of switches interconnected by traffic handling trunks. Many of these switches serve as central office switches that couple to a plurality of terminals as well as to other of the plurality of switches. The signaling network interfaces with the traffic network to perform call routing and management functions.

In an example of the manner in which a telephone network services a call, a switch (origination switch) receives a request from a calling terminal that includes a Dialed Number, the calling terminal requesting that the call be completed to a called terminal (associated with the Dialed Number) coupled to another switch (destination switch). The origination switch initiates call set up by interacting with the signaling network and requesting that the call be set up and routed to the called terminal (associated with the Dialed Number). During call set up, the origination switch transmits the Dialed Number to the signaling network. A signaling network element (such as a Service Switching Point) then performs a table lookup using the Dialed Number to determine the identity of the destination switch to which the called terminal connects. Once the identity of the destination switch is determined, the signaling network element performs a table lookup to determine the high usage route upon which the call may be routed. Once the high usage route is determined, the signaling network element attempts to allocate a routing path on the high usage route for the call. If the allocation is successful, the signaling network element sets up the call between the origination switch and the destination switch. The destination switch then completes the call to the called terminal.

However, if the signaling network element is unable to allocate a routing path on the high usage route, it performs another table lookup to determine whether a fixed tandem route exists from the origination switch to the destination switch. If such a fixed tandem route exists, the signaling network element attempts to allocate a routing path along the fixed tandem route. If a routing path on such fixed tandem route cannot be allocated, the signaling network element attempts to find another fixed tandem route to use. If the signaling network element cannot allocate a routing path on any of the fixed tandem route(s) for the call, the signaling network element routes the call to a resource that sends a "fast busy" signal, or another message to the calling terminal to indicate that the call could not be busy due to traffic or outage problems. When such an operation occurs, customer satisfaction is reduced and revenue is likely lost. This problem is becoming more pronounced with the introduction of Competitive Local Exchange Carriers (CLECs) which tend to overload the Incumbent Local Exchange Carrier's (ILEC's) systems.

Additional problems are encountered as service providers introduce Local Number Portability (LNP) support into their telephone networks. Because LNP causes many assumptions made with prior call routing techniques to be false, LNP cannot be easily introduced into the prior routing techniques. Thus, the service providers are faced with the difficult decision of either introducing LNP and causing problems in operating the existing network or to not introduce LNP.

Thus, there exists a need in the art for a call routing operation that may be implemented in a telephone network that successfully routes as many calls as possible, does not overload system resources and may operate in conjunction with Local Number Portability.

SUMMARY OF THE INVENTION

Thus, to overcome the shortcomings of the prior systems, among other shortcomings, a telephone network constructed according to the present invention includes an Enhanced Call Routing (ECR) function that reroutes calls when the high usage route and fixed tandem routes are overloaded or otherwise unavailable. Further, the ECR function tracks the operation of the telephone network on the basis of origination switches and destination switches and provides temporary network rerouting during outages and unusual over loading situations. Further, the ECR function supports Local Number Portability (LNP) so that it may operate in those telephone networks that are designed and/or modified to support LNP.

The ECR function, as described herein, is implemented in a signaling network element that intercouples with the traffic network. Such a signaling network element may be a Service Switching Point (SSP) and/or a Service Control Point (SCP), depending upon the specific implementation. The particular operations provided by the ECR function may dictate that, in some signaling networks, some or all of the functions be installed upon a particular type of signaling element. However, in other installations and with other functions supported, the ECR function may be installed on various of the signaling network elements or on a combination of two or more signaling network elements.

In a first operation according to the present invention, a call setup request is received by a Service Switching Point (SSP) from an origination switch in the traffic network, the call setup request including a Dialed Number (DN) or Local Routing Number (LRN). The SSP then performs a table lookup using the DN or LRN to determine the identity of a destination switch. The SSP then attempts to route the call by allocate resources on a high usage route. If unsuccessful in the allocation on the high usage route, the SSP attempts to allocate resources on the fixed tandem route(s).

If both attempts are unsuccessful, the SSP sends a Network_Busy message to the STP/SCP supporting the ECR function. The ECR function then attempts to determine an alternate tandem route for the call. If successful, the ECR function directs the SSP to route the call along the alternate tandem route, the alternate tandem route either being via the telephone network or via an alternate telephone network coupled thereto. If not successful, the ECR directs the SSP to send the call to a resource for caller notification.

In another operation according to the present invention, the ECR function monitors the number of Network_Busy messages received for each originating switch/destination switch pair in the telephone network. Based upon the number of Network_Busy messages received and the frequency at which they are received, the ECR function may determine that a temporary rerouting of calls between the originating switch and destination switch is required. In such case, the ECR function attempts to determine alternate tandem route(s) that may service the calls. If successful, the ECR function directs the origination switch to reroute incoming calls intended for the destination switch via the alternate tandem route(s).

The ECR function of the present invention supports LNP by mapping both dialed numbers and local routing numbers to destination point codes. The destination point codes uniquely identify the switches within the traffic network. Further operations are then based upon the destination point. Thus, operation correctly handles the LNP numbers.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
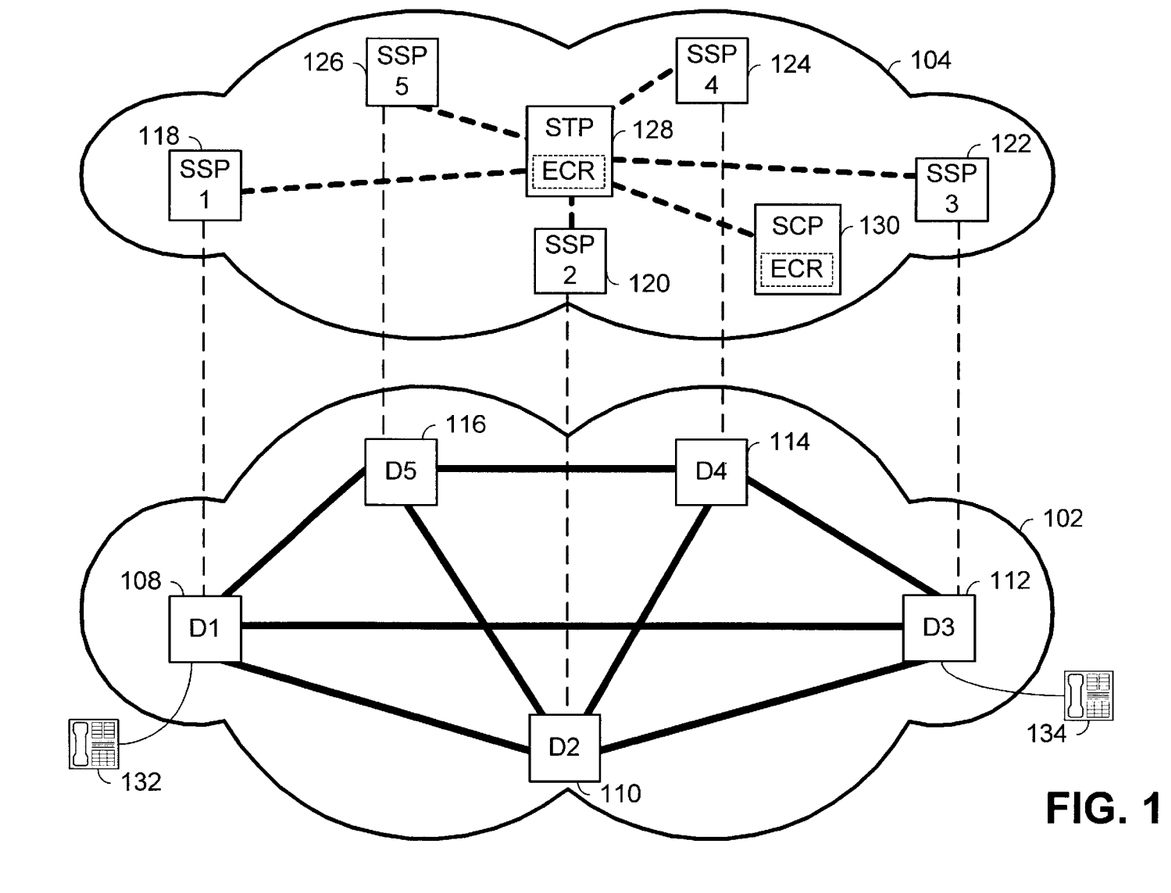
FIG. 1 is a block diagram illustrating generally a telephone traffic network and a telephone signaling network that operate according to the present invention.

FIG. 1 is a block diagram illustrating generally a telephone network that includes a traffic network and a signaling network and that operates according to the present invention. As is generally known, the operation of telephone networks may be segregated into a traffic network 102 that carries call traffic and the signaling network 104 that provides functions to route calls and to otherwise monitor and manage operation of the traffic network 102.

Northern Telecom Limited as well as other vendors support such an architecture and the structure has been standardized (to some extent) to allow such network construction to extend across platforms. A particular standard that has been developed (that may be employed in conjunction with the present invention) is the Common Channel Signaling Number 7 (CCS7) architecture. This type of architecture may be constructed and operated as an Advanced Intelligent Network (AIN).

The traffic network 102 includes a plurality of digital switches 108, 110, 112, 114 and 116 which are also refer-enced as D1, D2, D3, D4 and D5, respectively. The digital switches 108–116 are interconnected by traffic trunks which carry the calls from digital switch to digital switch that are routed in the traffic network 102. As is shown, however, each digital switch does not intercouple to each other digital switch. The traffic network 102 shown illustrates traffic trunks that couple digital switch D1 108 to D5 116, D3 112 and D2 110. A call routed between D1 108 and D3 112 is routed via the traffic trunk that connects D1 108 and D3 112. However, no direct traffic trunk connects D1 108 to D4 114. Thus, calls routed between D1 108 and D4 114 must be routed via another digital switch.

The digital switches 108–116 are represented as Service Switching Points (SSPs) 118–130, respectively, in the signaling network 104. The SSPs 118–130 therefore serve as entrance points to the signaling network 104 for the digital switches 108–116. As is shown, the SSPs 118–130 each couple to a Signal Transfer Point (STP) 128 that serves as a packet switch within the signaling network 104 to route signals among the elements of the signaling network 104. Coupled to the STP 128 is a Service Control Point (SCP) 130 that serves as the centralized network element in the signaling network architecture. The signaling network elements call upon the SCP 130 to perform functions of the AIN in transaction processing. While the traffic network 102 is circuit switched, the signaling network 104 is packet switched, and constructed accordingly.

The STP 128 and/or the SCP 130 support operations according to the present invention in performing enhanced call routing. The Enhanced Call Routing (ECR) functions are shown to reside upon the STP 128 and the SCP 130. In one embodiment, substantially all ECR functions are performed by the STP 128. In another embodiment, substantially all ECR functions are performed by the SCP 130. However, in still another embodiment, the ECR functions of the present invention are shared by the STP 128 and the SCP 130.

In a first operation according to the present invention, a call request is received from terminal 132 at D1 108 in which the terminal 132 requests a call be completed to terminal 134 coupled to D3 112. SSP1 118 attempts to setup and complete the call. SSP1 118 performs a table lookup based upon the Dialed Number (DN) of the call to determine the high usage route over which to route the call, such high usage route being the traffic trunk linking D1 108 to D3 112. However, the high usage route cannot be used due to over usage or an outage. Thus, the SSP1 118 continues its table lookup to find a fixed tandem route(s) over which the call can be completed. However, upon determining whether the call can be completed over the fixed tandem route(s), the SSP1 118 determines that the fixed tandem route(s) are also unavailable due to over usage or an outage. Resultantly, the an Automatic Flexible Routing (AFR) trigger is hit and a Transaction Capability Application Part (TCAP) Network__Busy message is sent to the STP 128 (and relayed to the SCP 130 in some embodiments). The STP 128 (or SCP 130) running the ECR function determines at least one most idle (or least cost) alternate tandem route(s) dynamically based upon the current traffic network 102 congestion status. The STP 128 (or SCP 130 via the STP 128) sends this information via an Analyze__Route message to the SSP1 118 which then attempts to route the call using the alternate tandem route(s).

In another operation according to the present invention, the ECR function monitors the number of TCAP Network__Busy messages that are received for a particular Origination DS and Destination DS pair. If the number of TCAP Network_Busy messages over the period of time (moving window) exceeds a threshold, the ECR function determines that an outage or unusual outage traffic condition exists between the Origination DS and Destination DS pair. The ECR function then dynamically determines other tandem routes that are the most idle (or least cost) over which calls between the Origination DS and Destination DS may be rerouted. The ECR function then instructs the SSP via a traffic management function in place on the SSP to temporarily reroute traffic. Then, after a period of time, the ECR (or another route determination function in place) may again determine the high usage route, tandem route(s) and again update the routing tables in the SSP.

Operation according to the present invention supports Local Number Portability (LNP). Thus, in routing calls, the signaling network 104 translates the DN or the Local Routing Number (LRN) into a Destination Point Code (DPC) that corresponds to one of the DSs 108–116. As is known, the NPA-NXX alone cannot uniquely identify a DS when LNP is employed. In subsequent operations, then, the DPC is employed to uniquely identify the destination DS.

Figure 2:
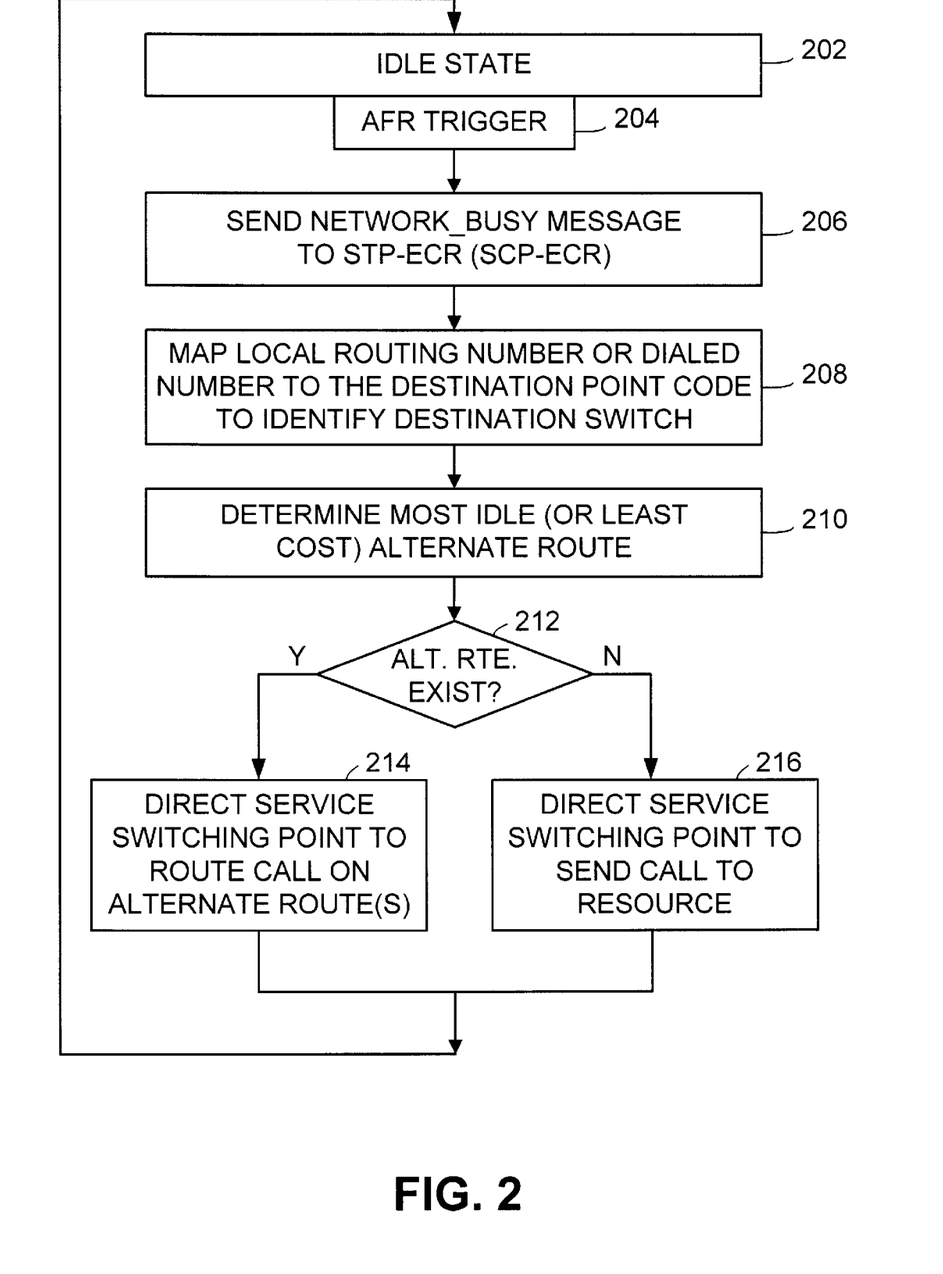
FIG. 2 is a logic diagram illustrating operation of a telephone network according to the present invention in immediately routing a call that is not routable via a high usage route and fixed tandem route(s) by determining an alternate tandem route and routing the call on the alternate tandem route.

FIG. 2 is a logic diagram illustrating operation of a telephone network according to the present invention in immediately routing a call that is not routable via a high usage route and fixed tandem route(s) by determining an alternate tandem route and routing the call on the alternate tandem route. The operation of FIG. 2 is with primary reference to the ECR function. However, operations are discussed that include interaction between the ECR and elements of the telephone network.

Operation commences at step 202 where the ECR function remains in an idle state until an AFR trigger is generated by an SSP at step 204. Such AFR trigger indicates that call routing was attempted on a high usage route and fixed tandem route(s) but that the high usage route and the fixed tandem route(s) were unavailable. From step 206, operation proceeds to step 206 wherein the SSP sends a Network_Busy message to the STP that is primarily implementing the ECR function. In an alternate embodiment, the SSP will send the Network_Busy message to the SCP (via at least one STP) that is implementing the ECR function.

At step 208 the STP maps the LRN or DN to a DPC to uniquely identify the destination DS. Operation at step 208 supports LNP. Note that the originating DS switch is known since the Network_Busy message identifies the originating DS. Next, at step 210, based upon the identity of the originating DS and the destination DS, the ECR function determines alternate tandem route(s) over which the call may be routed.

At step 212, the ECR function determines whether any alternate tandem route(s) exists, i.e., whether any alternate tandem route(s) was found at step 210. If so, the ECR function directs the SSP of the originating DS to route the call on the alternate tandem route(s) at step 214. If not, operation proceeds to step 216 where the ECR function directs the SSP of the originating DS to send the call to a resource that will generate a busy signal or provide a message to the caller that the call cannot be completed at the present time. From both steps 214 and 216, operation returns to step 202 where the ECR function reenters an idle state.

Figure 3:
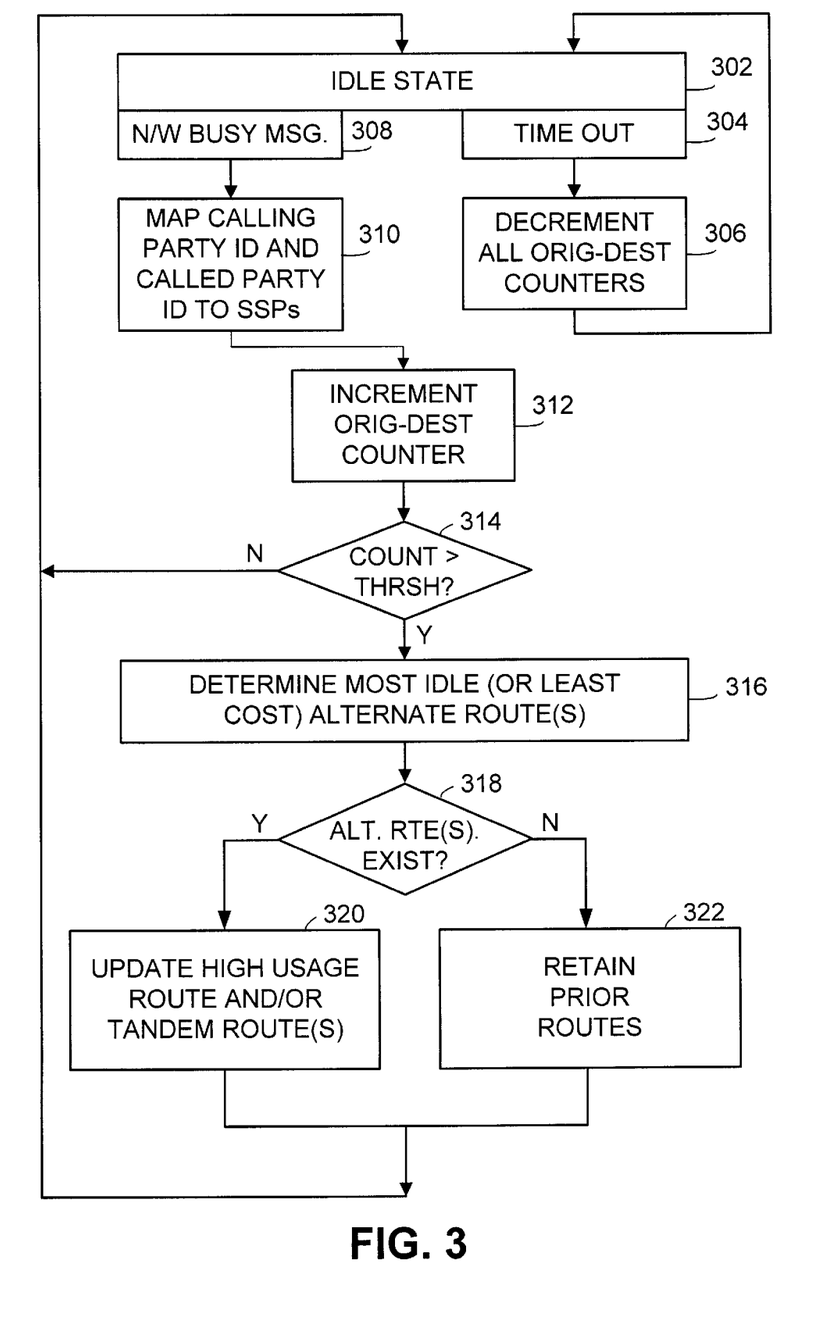
FIG. 3 is a logic diagram illustrating operation of a telephone network according to the present invention in determining temporary alternate routes during outages or unusual loading situations.

FIG. 3 is a logic diagram illustrating operation of a telephone network according to the present invention in determining temporary alternate routes during outages or unusual loading situations. Operation commences at step 302 wherein the ECR function is in an idle state. From step 302, operation may proceed to step 308 where a Network_Busy message is received from a SSP or to step 304 where a timeout has occurred.

When a Network_Busy message is received at step 308, operation proceeds to step 310 wherein the ECR function maps the CallingPartyID and CalledPartyID contained in the Network_Busy message to an Origination SSP and a Destination SSP, respectively. Operation then proceeds to step 312 where the ECR function increments an Origination-Destination Counter (ODC) corresponding to the Origination SSP and the Destination SSP.

For each Origination SSP and Destination SSP in the traffic network 102, the ECR function maintains a counter that tracks the number of Network_Busy messages received for the Origination SSP/Destination SSP pair. This ODC for the particular Origination SSP/Destination SSP pair is incremented at step 312. As is apparent, however, without managing these counters, the current counts would have little or no meaning. Thus, the counters are decremented periodically so that the counts indicate a relative overload level. From step 302, after a time out period has expired, all counters are decremented at step 306 and operation returns to step 302.

From step 312, operation proceeds to step 314 wherein it is determined whether the ODC has exceeded a threshold to indicate that an outage or temporary overload has occurred for the high usage route or the alternate tandem route(s). If the count does not exceed the threshold, operation returns to step 302. However, if the count does exceed the threshold, operation proceeds to step 316 wherein the ECR function determines the most idle (or least cost) alternate tandem route(s) for the Origination SSP/Destination SSP pair.

A Least Cost Routing (LCR) scheme may be used in connection with the ECR function to select the least-cost idle tandem route over which overflow traffic may be dynamically routed. In determining the least-cost idle tandem route, a cost function $f(o,t,d,T)$ is defined (where o is the origination switch, t is a potential tandem switch and d is the destination switch, and T is the time of day) and a tandem t can be selected for an origination-destination pair o-d such that the cost function $f(o,t,d,T)$ is minimized.

A first cost function example is provided in Equation (1) as:

$$(COST_{ot}+COST_{td})/\min(IT_{ot},IT_{td}) \qquad \text{Equation (1)}$$

where:

$COST_{ot}$ is the cost of a DS0 channel between the switches o and t;

$Cost_{td}$ is the cost of a DS0 channel between the switches t and d;

$IT_{ot}$ is the number of idle trunks between switches o and t at a given time; and $IT_{td}$ is the number of idle trunks between switches t and d at a given time.

If $\min(IT_{ot},IT_{td})=0$ then the cost function is assumed to be infinite.

A second cost function example is provided in Equation (2) as:

$$COST_{ot}+COST_{td} \qquad \text{Equation (2)}$$

where:

$COST_{ot}$ is the cost of a DS0 channel between the switches o and t; and $COSt_{td}$ is the cost of a DS0 channel between the switches t and d.

The objective of LCR in conjunction with Equation (2) is to select a tandem t, among all viable tandems for a given od pair with min($IT_{or}$,$IT_{td}$)>threshold, such that the cost function is minimized, as the recommendation, where threshold is a user configurable parameter with default value of 0.0. The cost can be input by the customer through a Human-Machine Interface (HMI) or ECR STP (or SCP) data fill. The cost (>0) has a default value of 1.0. The Tandem Recommendation Control (TRC) mechanism can be used to restrict an OD pair from tandeming calls via certain switches in any region or country.

If, at step 318, it is determined that alternate tandem route(s) exist, operation proceeds to step 320 wherein the tandem route(s) (and/or the high usage route) for the Origination SSP/Destination SSP pairs are updated. In enabling these alternate routes, a Flexible Re-Route (with or without Spray) or Block At Source command is issued to the SSP. From step 316, operation proceeds to step 318.

If, at step 318, it is determined that no alternate tandem routes exist for the Origination SSP and the Destination SSP pair, operation proceeds to step 322 wherein the prior routes are retained for the pair. From both step 320 and step 322, operation returns to step 302.

Alternate techniques may be employed to determine whether an outage or temporary overload has occurred (based upon the receipt of Network_Busy messages). One particular alternate technique involves tracking the Network_Busy messages over time and determining whether the number of Network_Busy messages that have been received in a time window exceed a threshold. The time window selected will end at the present time and extend backwards in time for a selected time period, e.g., 30 seconds. When the number of Network_Busy messages that have been received in the time window exceed a threshold selected for the time window, operation proceeds to step 316 of FIG. 3.

Figure 4:
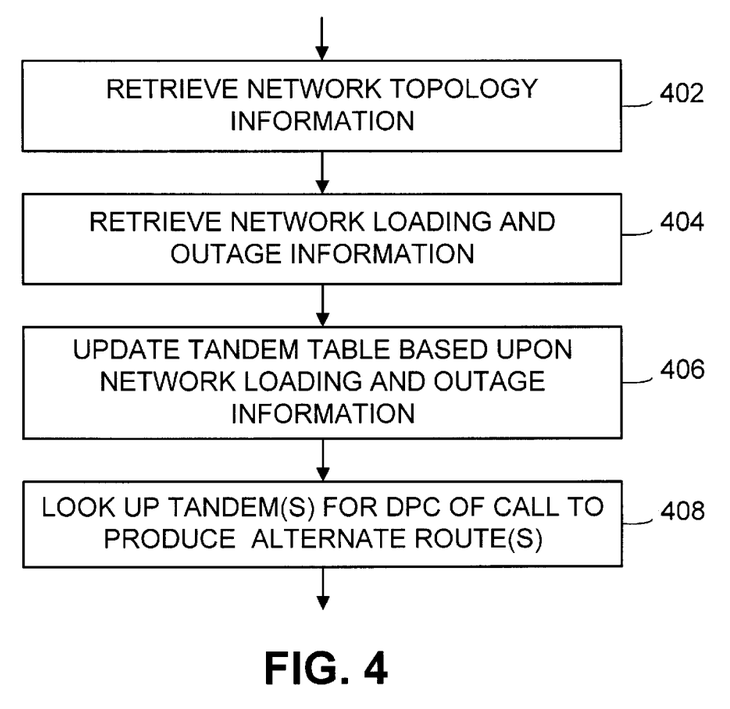
FIG. 4 is a logic diagram illustrating operation according to the present invention in determining alternate tandem routes for call routing considering both network topology and current loading conditions.

FIG. 4 is a logic diagram illustrating operation according to the present invention in determining alternate tandem routes for call routing considering both network topology and current loading conditions. The operation of FIG. 4 is performed at step 210 of FIG. 2 and step 316 of FIG. 3. The operation of FIG. 4 is described in more detail in U.S. Ser. No. 08/822,618 filed on Mar. 20, 1997 by Jean Regnier, Jean Choquette and Yvon Archambault, entitled Dynamically Controlled Routing of Calls in Intelligent Networks, issued on Jul. 27, 1999 as U.S. Pat. No. 5,930,348, assigned to Northern Telecom Limited, and incorporated herein by reference. However, according to the present invention, operation also supports LNP. These operations, while they may be performed by the STP, are performed by the SCP in most implementations.

Operation commences at step 402 wherein the ECR function retrieves network topology information for the traffic network under consideration. With this information retrieved, the ECR function retrieves network loading and outage information for current operating conditions of the traffic network. Then, at step 404, the ECR function updates the tandem table based upon the network loading and outage information and the network topology. Finally, the ECR function looks up tandem routes(s) for the DPC of the Originating SSP to produce the alternate tandem route(s), if any.

Figure 5:
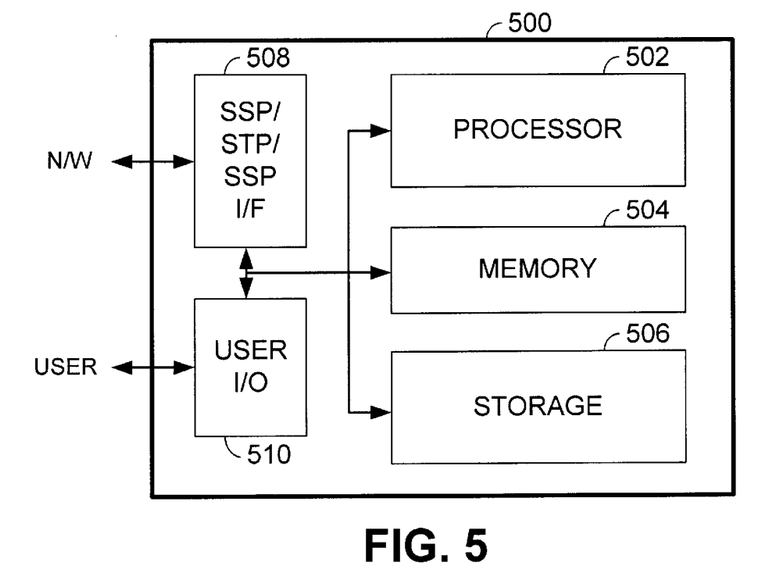
FIG. 5 is a block diagram generally illustrating the construction of a signaling network element that performs enhanced call routing operations according to the present invention.

FIG. 5 is a block diagram generally illustrating the construction of a signaling network element that performs enhanced call routing operations according to the present invention. In one embodiment, the signaling network element (SNE) 500 is a STP. However, in another embodiment, the SNE 500 is a SCP. In either case, the SNE 500 is a digital device and includes a processor 502, memory 504, storage 506, an Interface 508 and an Input/Output 510. These devices are intercoupled via a communication path 512 that may be a bus.

The processor 502 may be one or more processing devices that are selected and intercoupled to accomplish enhanced call routing functions according to the present invention as well as other functions required of the SNE 500. The memory 504 stores instructions and data and may be Dynamic Random Access Memory, Static Random Access Memory or other memory that is usable by the processor 502 during its ongoing operations. The storage 506 provides the SNE 500 with long term storage of data and instructions and may be magnetic disk storage, optical storage, tape storage or other long term storage devices.

The Interface 508 couples the SNE 500 to other elements of the signaling network including SSPs, SCPs and STPs. Since the signaling network is packet switched, the Interface 508 supports packet switching operations consistent with the type of packet switching supported by the signaling network. Finally, the SNE 500 includes a user Input/Output interface that interfaces the SNE 500 to a user. Such interface may couple the SNE 500 to a console (either locally or remotely) to allow a user to program and modify operations of the SNE 500.

The ECR function, in one embodiment, is accomplished by the processing of a set of software instructions that are stored in the SNE 500. These software instructions are stored in the storage 506 and the memory 504 and selectively executed by the processor 502. In executing these operations, the processor 502 uses the Interface 508 to interact with coupled SSPs and, in some operations, a coupled SCP. These operations have been previously described with reference to FIGS. 1 through 4.

Figure 6:
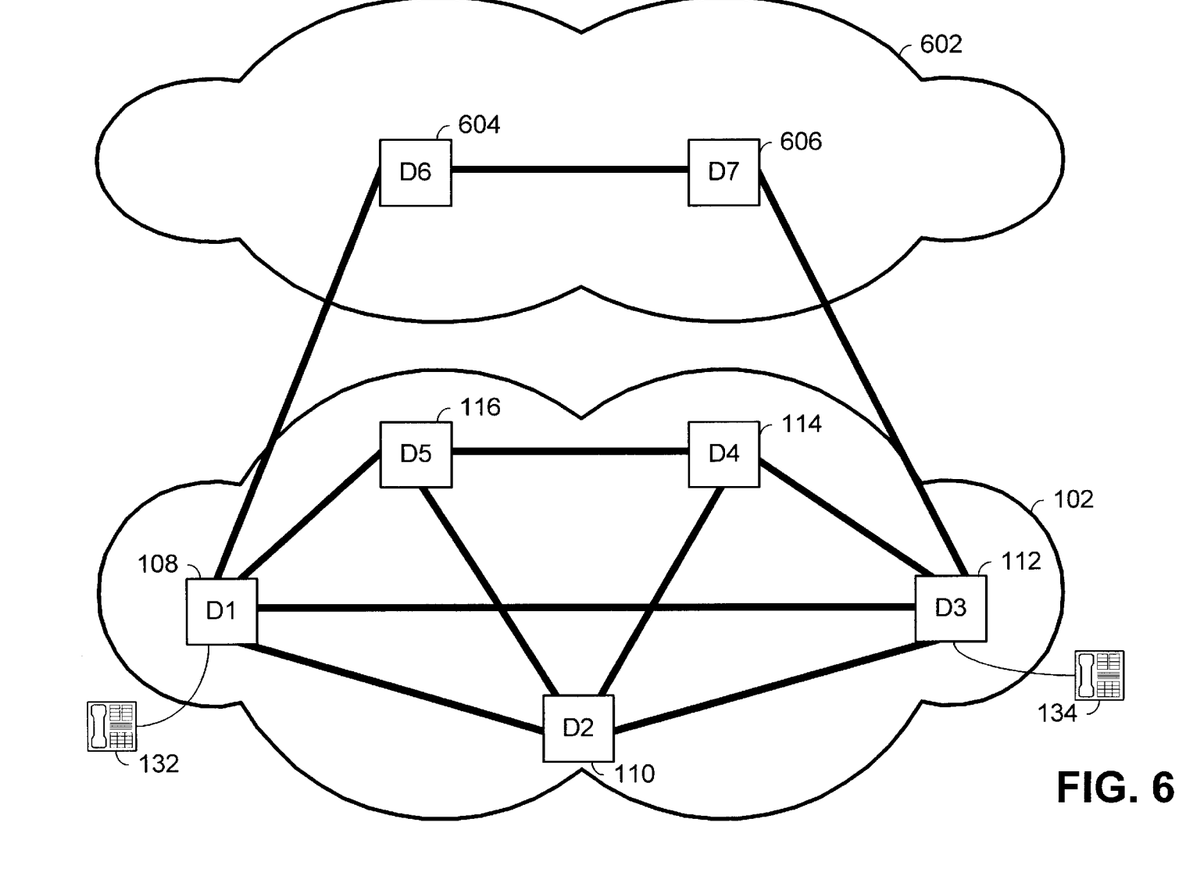
FIG. 6 is a block diagram illustrating a first telephone network, a second telephone network, and a routing path for calls rerouted via the second telephone network according to the present invention.

FIG. 6 is a block diagram illustrating a first telephone network and a second telephone network and a routing path for calls rerouted to the second telephone network according to the present invention. The first telephone network includes the traffic network 102 previously described with reference to FIG. 1. The traffic network 102 couples to a second traffic network 602 operated by a separate carrier. As is known, competing carriers each typically install and operate their own traffic networks. The competing carriers attempt to route as much traffic through their own networks as possible. Thus, the traffic network 602 is independent from the traffic network 102 except as inter-carrier operations apply.

In an operation according to the present invention, a call is made at terminal 132 coupled to D1 108 and intended for terminal 134 coupled to D3 112. However, because of loading levels and/or current outages, the call cannot be routed over the high usage route or the fixed tandem route(s). Thus, the ECR function is enacted in an attempt to reroute the call along an alternate tandem route.

In its operation, the ECR function cannot determine an alternate tandem route within traffic network 102. But, instead of sending the call to a resource, the ECR function reroutes the call via D6 604 and D7 606 of the traffic network 602 operated by the other carrier. While the operator of the traffic network 102 will incur a cost to route the call through the traffic network 602, the operator has made a decision to route such call instead of not routing the call. Alternate tandem routes via the other carrier may be employed in all operations according to the present invention, including those operations described with respect to FIGS. 2 and 3.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. In a telephone network having a plurality of intercoupled switches, a method for routing a call comprising:
receiving a call from a terminal coupled to a first switch of the plurality of switches, the call intended for a terminal coupled to a second switch of the plurality of switches;
attempting and failing to route the call along a high usage route and each of a plurality of previously identified fixed tandem routes from the first switch to the second switch;
attempting and failing to determine an alternate tandem route from the first switch to the second switch that is serviced solely by the telephone network;
determining an alternate tandem route that is serviced jointly by the telephone network and a telephone network operated by another carrier, wherein determining the alternate tandem route further comprises receiving and considering loading information from the another carrier; and
directing the first switch to route the call along the alternate tandem route to the second switch.

2. The method of claim 1, further comprising:
determining an overflow situation along a high usage route and sending an overflow message to a service control point of a coupled signaling network;
the service control point determining an alternate tandem route for subsequent operations.

3. The method of claim 1, further comprising:
determining an overflow situation along a high usage route and sending an overflow message to a signal transfer point of a coupled signaling network;
the signal transfer point determining an alternate tandem route for subsequent operations.

4. The method of claim 3, wherein the signal transfer point interacts with a service control point to determine the alternate tandem route.

5. The method of claim 1, wherein determining the alternate tandem route from the first traffic switch to the second traffic switch comprises:
retrieving a telephone network topology for the telephone network;
from the telephone network topology, considering all possible routes between the first traffic switch to the second traffic switch; and
retrieving trunk outage and loading data for all possible routes between the first switch to the second switch; and
based upon the trunk loading data, determining the alternate tandem route.

6. The method of claim 1, further comprising:
determining a cost to be paid to the another carrier for routing the call along the alternate tandem route; and
when the cost is acceptable, routing the call along the alternate tandem route.

7. The method of claim 1, further comprising the step of converting a dialed number to a destination point code, the destination point code identifying the second switch.

8. The method of claim 1, further comprising the step of converting a local routing number supported in a local number portability environment to a destination point code, the destination point code identifying the second switch.

9. For operation within a signaling network that manages operation of a traffic network having a plurality of intercoupled switches, a signaling network element comprising:
a signaling network interface that interfaces the signaling network element to other signaling network elements;
a processor adapted to execute instructions and to operate upon data; and
memory adapted to store instructions and data, the memory storing instructions that cause the signaling network element to:
detect an overflow situation along a high usage route of the traffic network and at least one fixed tandem route of the traffic network from a first switch to a second switch;
upon detecting the overflow situation, attempt to determine an alternate tandem route from the first switch to the second switch that is serviced solely by the telephone network;
when the attempt to determine an alternate tandem route from the first switch to the second switch that is serviced solely by the telephone network is unsuccessful, to determine an alternate tandem route that is serviced jointly by the telephone network and a telephone network operated by another carrier, wherein determining the alternate tandem route further comprises considering a cost to be paid to the another carrier for routing the call along the alternate tandem route; and
direct the first switch to route a call along the alternate tandem route to the second switch.

10. The signaling network element of claim 9, wherein the signaling network element comprises a service control point.

11. The signaling network element of claim 9, wherein the signaling network element comprises a signal transfer point.

12. The signaling network element of claim 11, wherein the signal transfer point interacts with a service control point to determine the alternate tandem route.

13. The signaling network element of claim 9, wherein the instructions further cause the signaling network element to:
determine the alternate tandem route from the first switch to the second switch by:
retrieving a telephone network topology for the telephone network;
from the telephone network topology, considering a plurality of possible alternate tandem routes between the first switch to the second switch;
retrieving trunk outage and loading data for the possible alternate tandem routes between the first switch and the second switch; and
based upon the trunk loading data, determining the alternate tandem route.

14. The signaling network element of claim 9, wherein in selecting the alternate tandem route from the possible alternate tandem routes, the signaling network element considers the loading on each of the possible alternate tandem routes.

15. The signaling network element of claim 9, wherein the signaling network element converts a dialed number to a destination point code, the destination point code identifying the second switch.

16. The signaling network element of claim 9, wherein the signaling network element converts a local routing number supported in a local number portability environment to a destination point code, the destination point code identifying the second switch.

17. In a telephone network having a plurality of intercoupled switches, a method for routing a call comprising:

receiving a call from a terminal coupled to a first switch of the plurality of switches, the call intended for a terminal coupled to a second switch of the plurality of switches;

attempting and failing to route the call along a high usage route and each of a plurality of previously identified fixed tandem routes from the first switch to the second switch;

attempting and failing to determine an alternate tandem route from the first switch to the second switch that is serviced solely by the telephone network;

determining an alternate tandem route that is serviced jointly by the telephone network and a telephone network operated by another carrier, wherein determining the alternate tandem route further comprises considering a cost to be paid to the another carrier for routing the call along the alternate tandem route; and directing the first switch to route the call along the alternate tandem route to the second switch.

18. The method of claim 17, wherein determining the alternate tandem route further comprises receiving and considering loading information from the another carrier.

19. The method of claim 17, wherein determining the alternate tandem route from the first traffic switch to the second traffic switch comprises:

retrieving a telephone network topology for the telephone network;

from the telephone network topology, considering all possible routes between the first traffic switch to the second traffic switch;

retrieving trunk outage and loading data for all possible routes between the first switch to the second switch; and based upon the trunk loading data, determining the alternate tandem route.

20. The method of claim 17, further comprising the step of converting a local routing number supported in a local number portability environment to a destination point code, the destination point code identifying the second switch.

* * * * *